US012697917B2

(12) United States Patent
Brooks et al.

(10) Patent No.: US 12,697,917 B2
(45) Date of Patent: Aug. 4, 2026

(54) REVERSIBLE RATCHET ASSEMBLY AND RATCHET SYSTEM

(71) Applicants: Zachary M. Brooks, Richfield, WI (US); Benjamin M. Payne, Glendale, AZ (US)

(72) Inventors: Zachary M. Brooks, Richfield, WI (US); Benjamin M. Payne, Glendale, AZ (US)

(73) Assignee: Cynergi3 West, LLC, Phoenix, AZ (US)

( * ) Notice: Subject to any disclaimer, the term of this patent is extended or adjusted under 35 U.S.C. 154(b) by 263 days.

(21) Appl. No.: 18/490,488

(22) Filed: Oct. 19, 2023

(65) Prior Publication Data

US 2025/0128656 A1 Apr. 24, 2025

(51) Int. Cl.
B60P 7/00 (2006.01)
B60P 7/08 (2006.01)
(52) U.S. Cl.
CPC .................................. B60P 7/083 (2013.01)
(58) Field of Classification Search
CPC ......... B60P 7/083; B60P 7/0853; B60P 3/079; B66D 3/02
See application file for complete search history.

(56) References Cited

U.S. PATENT DOCUMENTS

| | | | | |
|---|---|---|---|---|
| 5,611,521 | A | * | 3/1997 | Grover .................. B25B 21/002 |
| | | | | 254/235 |
| 6,848,871 | B1 | | 2/2005 | Cottrell |

| | | | |
|---|---|---|---|
| 7,360,978 | B2 | 4/2008 | Howes |
| 7,484,917 | B2 | 2/2009 | Howes |
| 7,585,140 | B1 | 9/2009 | Howes et al. |
| 7,682,114 | B2 | 3/2010 | Howes et al. |
| 7,824,139 | B2 | 11/2010 | Howes et al. |
| 8,061,941 | B2 | 11/2011 | Howes |
| 8,382,406 | B2 | 2/2013 | Howes et al. |
| 11,383,633 | B1 | 7/2022 | Howes et al. |
| 11,548,429 | B1 | 1/2023 | Howes et al. |
| 2006/0263160 | A1 | 11/2006 | Howes |
| 2006/0263161 | A1 | 11/2006 | Howes |
| 2008/0229889 | A1 * | 9/2008 | Hopper ................. B25B 13/463 |
| | | | 81/63.1 |

(Continued)

FOREIGN PATENT DOCUMENTS

| | | | | |
|---|---|---|---|---|
| WO | WO-2005110810 A1 * | 11/2005 | ............ | B60P 7/0861 |
| WO | WO 2006/124254 A2 | 11/2006 | | |

(Continued)

*Primary Examiner* — Emmanuel M Marcelo

(74) *Attorney, Agent, or Firm* — Reinhart Boerner Van Deuren P.C.

(57) ABSTRACT

A reversible ratchet assembly, reversible ratchet system, and methods are provided. The reversible ratchet assembly includes a plurality of components including a reversible ratchet assembly for a ratchet tie down system includes a spindle body, a ratchet head, a ratchet gear, and a ratchet pawl. These components can be assembled in a first configuration for operation in a first direction about a ratchet axis and assembled in a second configuration for operation in an opposite second direction. The ratchet assembly may also include a holding gear and holding pawl that can be mounted in first and second configurations.

20 Claims, 6 Drawing Sheets

(56)                    References Cited

U.S. PATENT DOCUMENTS

| | | | |
|---|---|---|---|
| 2008/0245194 A1 * | 10/2008 | Ross | B25B 13/463 |
| | | | 81/63.1 |
| 2009/0196705 A1 | 8/2009 | Howes et al. | |
| 2009/0196706 A1 | 8/2009 | Howes et al. | |
| 2009/0196707 A1 | 8/2009 | Howes et al. | |
| 2009/0241741 A1 | 10/2009 | Howes et al. | |
| 2010/0014934 A1 | 1/2010 | Howes | |
| 2012/0257942 A1 * | 10/2012 | Empey | B60P 3/075 |
| | | | 410/3 |
| 2021/0339672 A1 * | 11/2021 | Andre | B60P 3/075 |

FOREIGN PATENT DOCUMENTS

| | | | |
|---|---|---|---|
| WO | WO 2006/124262 A2 | 11/2006 | |
| WO | WO-2020104740 A1 * | 5/2020 | B60P 7/083 |

* cited by examiner

REVERSIBLE RATCHET ASSEMBLY AND RATCHET SYSTEM

FIELD OF THE INVENTION

This invention generally relates to ratchet tie down systems and particularly ratchet tie down systems for trailers.

BACKGROUND OF THE INVENTION

Trailers are used to haul many different types of objects. The objects are typically tied to the trailer to prevent them from falling of the trailer or moving around on the trailer to prevent damage or loss. Tie down systems are often used to secure the objects to the trailer. One particular type of tie down system is a ratcheting tie down system that uses a ratchet assembly in combination with a strap like member that can be shortened or lengthened to tighten against and/or around the object to secure it to the trailer.

In some larger trailers, the ratchet assembly is mounted in a fixed configuration to the frame of the trailer, such as to the frame of a deck of the trailer upon which the objects are supported during transport. While the assembly is mounted in a fixed configuration, e.g. so it won't fall off, portions thereof may rotate relative to the frame to allow for tightening and loosening the strap.

When multiple ratchet assemblies are provided for securing multiple different objects, e.g. different objects or different parts of a same object, it can be desirable to provide for flexibility in the direction at which the ratchet assemblies operate to tighten the strap thereof.

The present invention provides improvements over the current state of the art as it relates to ratchet tie down systems and particularly ratchet tie down systems for trailers.

BRIEF SUMMARY OF THE INVENTION

Examples of the application provide new and improved ratchet assemblies and particularly reversible ratchet assemblies. The ratchet assemblies may be used for ratchet tie down systems.

In an example, a reversible ratchet assembly for a ratchet tie down system includes a spindle body, a ratchet head, a ratchet gear, and a ratchet pawl. The spindle body has a ratchet axis. The ratchet head is configured to have torque applied thereto about the ratchet axis, such as an external torque applied by an user. The ratchet gear has a plurality of teeth that are angularly spaced apart about the ratchet axis. The ratchet gear is removably mountable to the ratchet head for rotation with the ratchet head about the ratchet axis in first and second orientations. The ratchet pawl is removably mountable to the spindle body in first and second orientations. When the ratchet gear is mounted to the ratchet head in the first orientation and the ratchet pawl is mounted to the spindle body in the first orientation, the ratchet gear and ratchet head can rotate relative to the spindle body in a first angular direction about the ratchet axis but the ratchet pawl engages the ratchet gear such that the ratchet gear and ratchet head cannot rotate relative to the spindle body in a second angular direction about the ratchet axis such that rotation of the ratchet head in the second angular direction rotates the spindle body in the second angular direction. When the ratchet gear is mounted to the ratchet head in the second orientation and the ratchet pawl is mounted to the spindle body in the second orientation, the ratchet gear and ratchet head can rotate relative to the spindle body in a second angular direction about the ratchet axis but the ratchet pawl engages the ratchet gear such that the ratchet gear and ratchet head cannot rotate relative to the spindle body in a first angular direction about the ratchet axis such that rotation of the ratchet head in the first angular direction rotates the spindle body in the first angular direction.

In one example, a holding gear has a plurality of teeth that are angular spaced apart about the ratchet axis. The holding gear is removably mountable to the spindle body for rotation with the spindle body about the ratchet axis in first and second orientations. A holding pawl is mountable relative to the holding gear in first and second orientations. When the holding gear is mounted to the spindle body in the first orientation and the holding pawl is mounted relative to the holding gear in the first orientation, the holding gear and spindle body can rotate in the second angular direction about the ratchet axis but the holding pawl engages the holding gear such that the holding gear and spindle body are prevented from rotating in the first angular direction about the ratchet axis. When the holding gear is mounted to the spindle body in the second orientation and the holding pawl is mounted relative to the holding gear in the second orientation, the holding gear and spindle body can rotate in the first angular direction about the ratchet axis but the holding pawl engages the holding gear such that the holding gear and spindle body are prevented from rotating in the second angular direction about the ratchet axis.

In one example, the ratchet gear is removably mountable to the ratchet head in the first and second orientations with a splined connection.

In one example, a ratchet pawl biasing member biases the ratchet pawl radially outward relative to the spindle body. The teeth of the ratchet gear bias the ratchet pawl radially inward when the ratchet gear rotates relative to the spindle body.

In one example, the holding gear is removably mountable to the spindle body in the first and second orientations with a splined connection.

In one example, the holding pawl is removably attachable to a mounting body in the first and second orientations. In some examples, the mounting body may be a portion of a frame of a trailer or a component that can be mounted to the frame of a trailer.

In one example, the holding pawl pivots about a holding pawl axis that is parallel to the ratchet axis and radially offset from the ratchet axis.

In one example, the ratchet pawl pivots relative to the spindle body about a ratchet pawl axis that is parallel to the ratchet axis and radially offset from the ratchet axis.

In one example, the ratchet head has a plurality of angularly offset handle receiving openings formed therein configured for receipt of a handle therein. The handle transfers externally applied torque by a user to the ratchet head.

In one example, the ratchet head is removably attachable to the spindle body. The ratchet head secures the ratchet pawl to the spindle body.

In one example, the ratchet pawl may be transitioned between the first and second orientations with the ratchet head removed from the spindle body.

In one example, a tie-down strap is provided. The spindle body has a main body portion and a spindle shaft. The ratchet pawl is mountable to the main body portion in the first and second orientations. The tie-down strap is fixedly attachable to the spindle body and wrapable around the spindle shaft when the spindle shaft rotates about the ratchet axis.

In one example, the spindle shaft is removably attached to the main body portion. In other examples, the spindle shaft and main body are formed as a single component.

In an example, a ratchet system for a tie-down system for a transport trailer is provided. The system includes first and second ratchet assemblies as outlined above. However, the first and second ratchet assemblies are configured in opposite orientations.

In one example, the ratchet gear of the first ratchet assembly is in the first orientation and the ratchet pawl of the first ratchet assembly is in the first orientation. The ratchet gear of the second ratchet assembly is in the second orientation and the ratchet pawl of the second ratchet assembly is in the second orientation. As such, the ratchets operate in opposite directions about their respective ratchet axis.

In one example, the ratchet axis of the first ratchet assembly is parallel to the ratchet axis of the second ratchet assembly.

In one example, the first direction of the first ratchet assembly is the same as the first direction of the second ratchet assembly.

In one example, each of the first and second ratchet assemblies includes a holding gear and a holding pawl. The holding gear has a plurality of teeth angularly spaced apart about the ratchet axis. The holding gear removably mounts to the spindle body for rotation with the spindle body about the ratchet axis in first and second orientations. The holding pawl mounts relative to the holding gear in first and second orientations. When the holding gear is mounted to the spindle body in the first orientation and the holding pawl is mounted relative to the holding gear in the first orientation, the holding gear and spindle body can rotate in the second angular direction about the ratchet axis but the holding pawl engages the holding gear such that the holding gear and spindle body are prevented from rotating in the first angular direction about the ratchet axis. When the holding gear is mounted to the spindle body in the second orientation and the holding pawl is mounted relative to the holding gear in the second orientation, the holding gear and spindle body can rotate in the first angular direction about the ratchet axis but the holding pawl engages the holding gear such that the holding gear and spindle body are prevented from rotating in the second angular direction about the ratchet axis. The holding gear of the first ratchet assembly is in the first orientation and the holding pawl of the first ratchet assembly is in the first orientation. The holding gear of the second ratchet assembly is in the second orientation and the holding pawl of the second ratchet assembly is in the second orientation.

In one example, the components of the first and second ratchet assemblies are identical.

In an example, a method of assembling a ratchet system as outlined above is provided.

In a particular method, the method includes:
for the first ratchet assembly:
a) mounting the ratchet gear to the ratchet head in the first orientation; and
b) mounting the ratchet pawl to the spindle body in the first orientation; for the second ratchet assembly:
a) mounting the ratchet gear to the ratchet head in the second orientation; and
b) mounting the ratchet pawl to the spindle body in the second orientation.

In a further method, the method includes: for the first ratchet assembly:
a) mounting the ratchet gear to the ratchet head in the first orientation; and b) mounting the ratchet pawl to the spindle body in the first orientation; for the second ratchet assembly:
a) mounting the ratchet gear to the ratchet head in the second orientation; and
b) mounting the ratchet pawl to the spindle body in the second orientation; for the first ratchet assembly:
a) mounting the holding gear to the spindle body in the first orientation; and
b) mounting the holding pawl relative to the holding gear in the first orientation; for the second ratchet assembly:
a) mounting the holding gear to the spindle body head in the second orientation; and
b) mounting the holding pawl relative to the holding gear in the second orientation.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
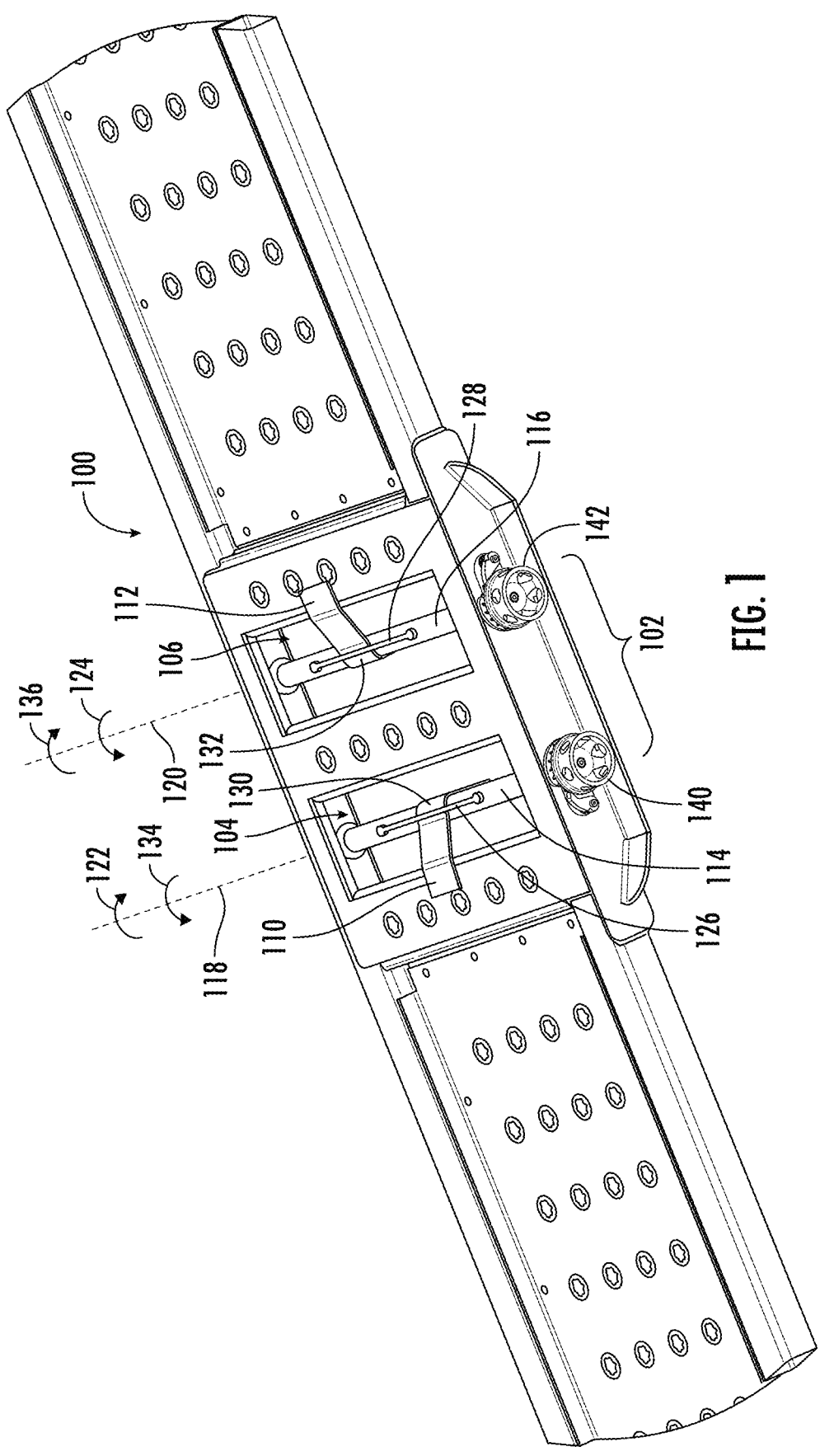
FIG. 1 is a partial illustration of a deck of a trailer having a ratchet tie down system according to the application.

FIG. 1 illustrates a portion of a deck 100 of a trailer for hauling cargo, and particularly for hauling vehicles.

The deck 100 includes a ratchet tie down system 102 that includes first and second ratchet strap assemblies 104, 106. Typically, the ratchet strap assemblies 104, 106 are configured for securing, among other components, wheels of a vehicle to the deck 100.

Each ratchet strap assembly 104, 106 includes a strap 110, 112, only a portion of which being illustrated. While the illustrated embodiments use straps 110, 112 other similar flexible components such as belts, chains, rope, cable, etc. could be employed.

Each strap 110, 112 is connected to a corresponding winding member in the form of bar 114, 116 about which the strap 110, 112 can be wound to tighten the strap 110, 112 to tighten the strap 110, 112 relative to the component being secured to deck 100. In particular, the bar 114, 116 is wound about ratchet axis 118, 120, illustrated by arrows 122, 124, to tighten the strap 110, 112.

A strap holding member 126, 128 assists in securing the strap 110, 112 to bar 114, 116. In this example, strap 110, 112 is located between bar 114, 116 and strap holding member 126, 128. In use, the strap 110, 112 can be pulled tight relative to the component being secured to deck 100 using tag end 130, 132 of strap 110, 112 and then 114, 116 can be rotated (arrows 122, 124) to further tighten and secure strap 110, 112. When it is desired to release the secured component, the bar 114, 116 can be rotated in the opposite direction, illustrated by arrows, 134, 136, to loosen strap 110, 112.

In the illustrated embodiment, the first and second ratchet assemblies 104, 106 are configured to rotate in opposite directions from one another to tighten straps 110, 112 and also to rotate in opposite directions from one another to release straps 110, 112.

In the illustrated embodiment, the first and second ratchet strap assemblies 104, 106 are reversible ratchet assemblies such that the direction at which they rotate to tighten the strap 110, 112 and release the strap 110, 112 can be switched. As such, the first and second ratchet strap assemblies 104, 106 have identical components that are assembled differently to allow for the opposite direction of operation as will be more fully understood in view of the following descriptions.

The ratchet assemblies 104, 106 include a ratchet head 140, 142 configured to receive external torques about ratchet axis 118, 120 for tightening straps 110, 112. In this example, the ratchet head 140, 142 includes apertures 146, 148 for receipt of bar 150. The user can apply force to bar 150 to apply torque to ratchet head 140, 142. Typically, the ratchet head 140, 142 is configured with pairs of apertures 146, 148 on opposite sides of the ratchet axis 118, 120. However, other configurations of applying torque to ratchet head 140, 142 are contemplated. For example, a fixed handle could be attached to each head 140, 142.

Here there are six apertures 146, 148 in head 140, 142 such that there are three pairs of apertures 146, 148 per ratchet head 140, 142. Typically, the bar 150 will extend through both apertures in the pair when rotating the ratchet head 140, 142.

Figure 3:
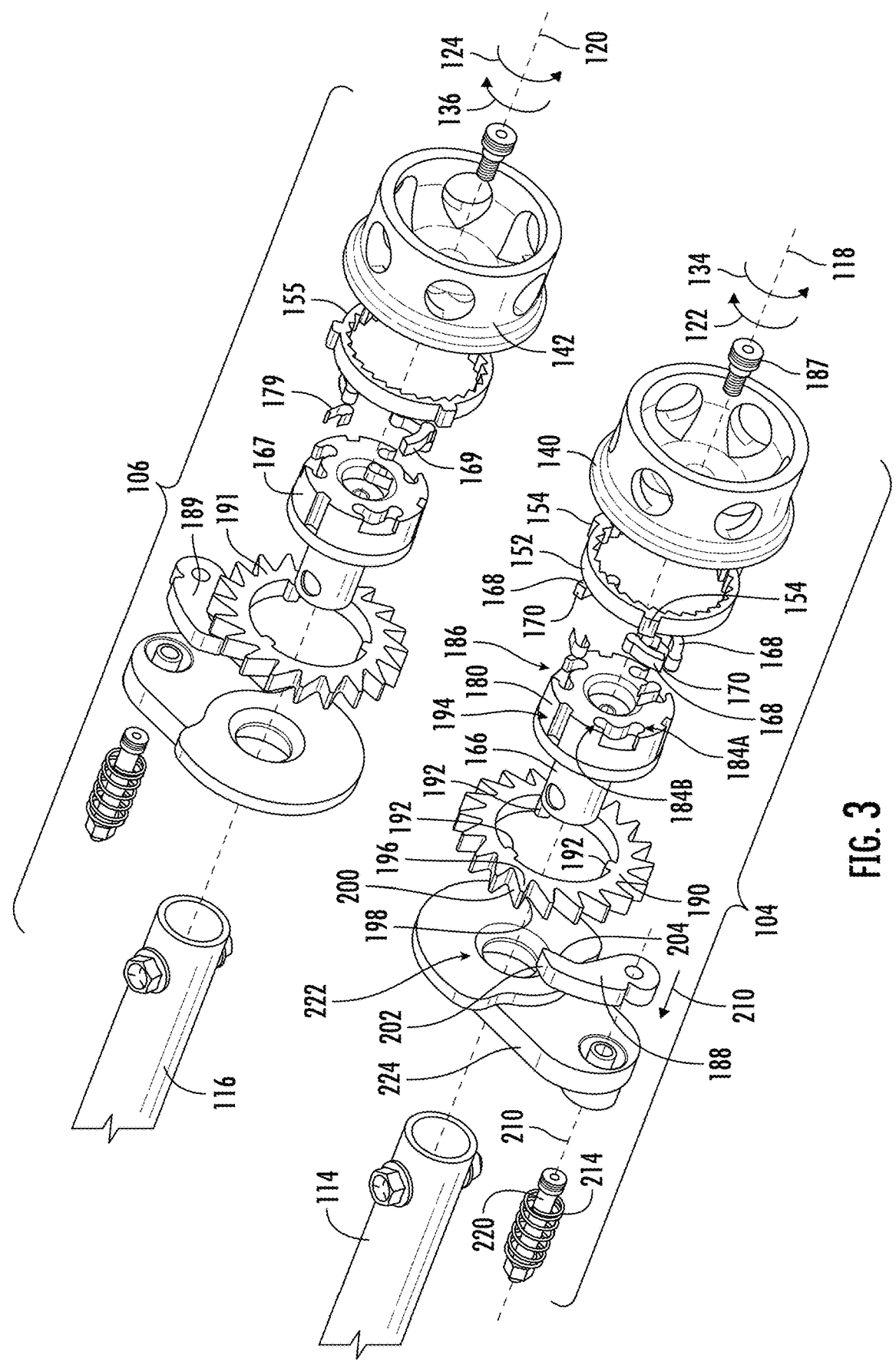
FIG. 3 is an exploded illustration of the ratchet tie down system.

FIG. 3 illustrates the ratchet assemblies 104, 106 in exploded form. As noted, the first ratchet assembly 104 has the same components as the second ratchet assembly 106 but the two ratchet assemblies 104, 106 are configured to operate in opposite directions.

Figure 4:
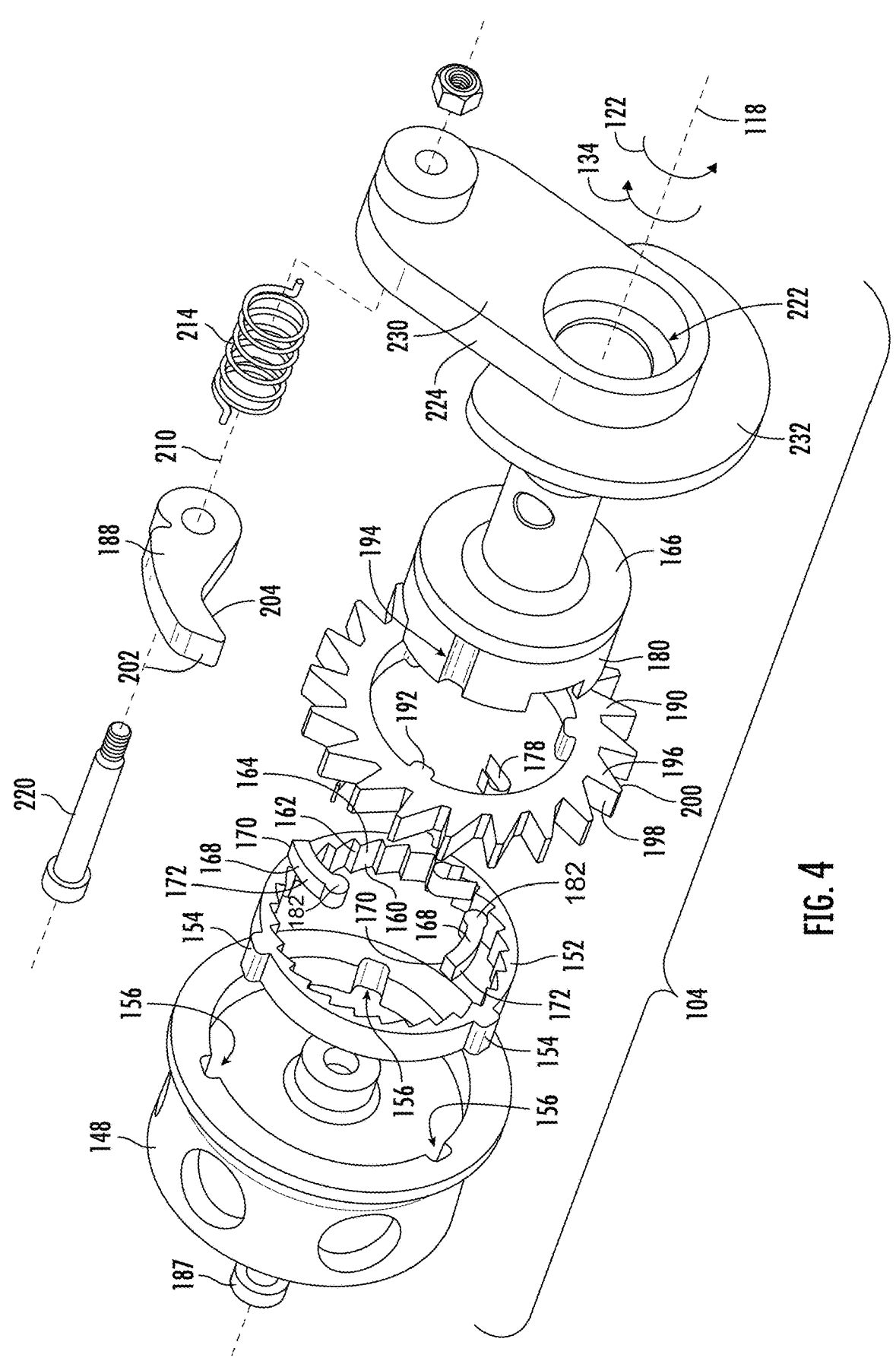
FIG. 4 is a further exploded illustration of one of the ratchet assemblies of the ratchet tie down system.
Figure 5:
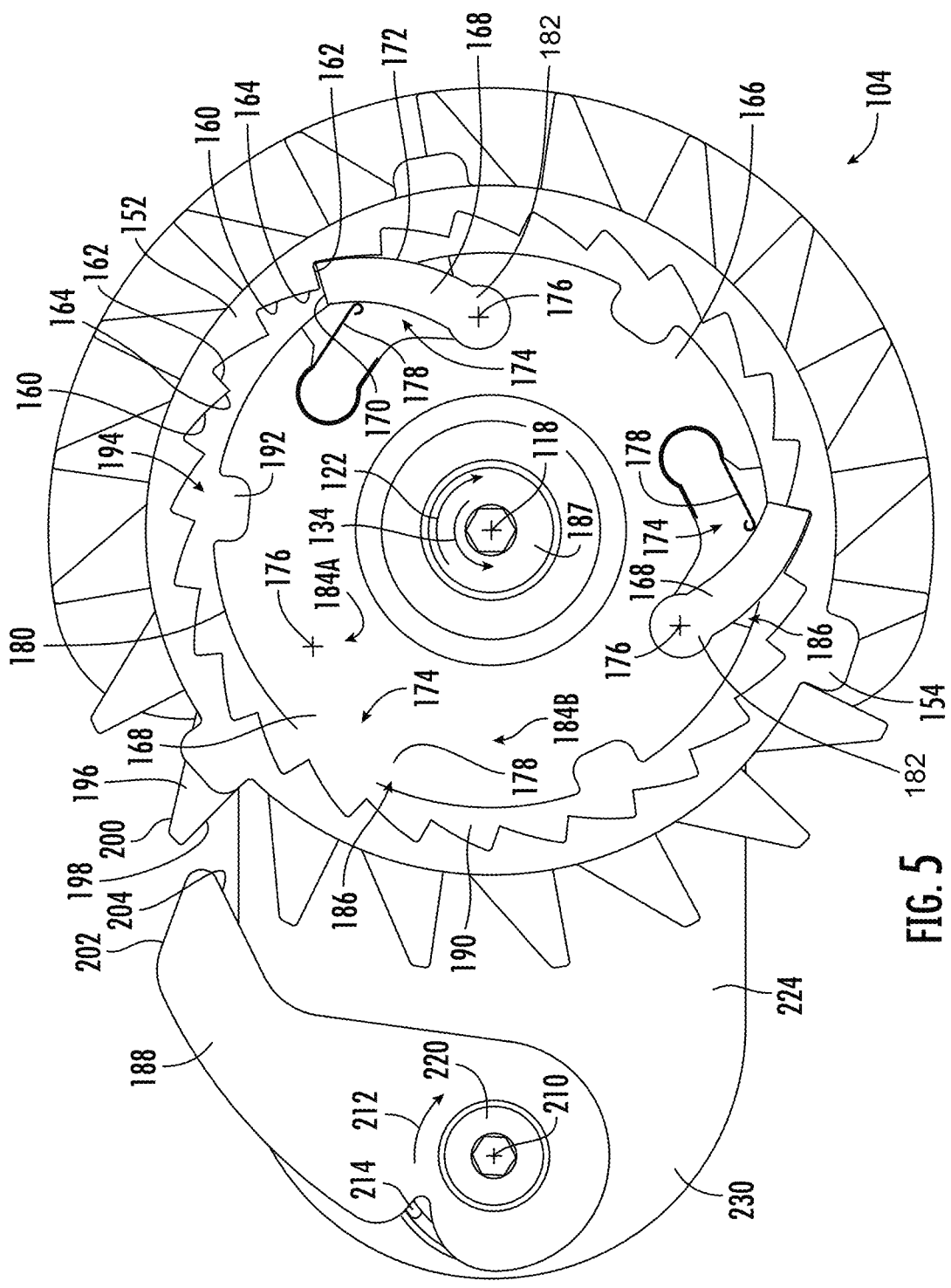
FIG. 5 is a partial end view of one of the ratchet assemblies of the ratchet tie down system.

With additional reference to FIGS. 4 and 5, the first ratchet assembly 104 includes ratchet head 140 which carries ratchet gear 152 such that ratchet gear 152 rotates with ratchet head 140 about ratchet axis 118.

Here, ratchet gear 152 is mounted to ratchet head 140 with a splined connect. The splined connection is provided by at least one (three in this example) cooperating radially extending projections 154 and three grooves 156. While illustrated with the projections 154 provided by ratchet gear 152 and grooves 156 as part of ratchet head 140, this arrangement could be switched. Also, more or fewer grooves 156 and projections 154 could be used.

In this example, the splined connection allows for the ratchet gear 152 to be mounted to the ratchet head 140 by sliding axial motion. However, in other examples, the ratchet gear could be mounted to the ratchet head 140 using other techniques such as mechanical fasteners.

The ratchet gear 152 has a plurality of ratchet teeth 160 that are angularly spaced apart about ratchet axis 118. The ratchet teeth are configured with abutment surfaces 162 and cam surfaces 164.

The ratchet gear 152 may be mounted to the ratchet head 140 such that the abutments 162 face a first angular direction about axis 118 (such as illustrated in FIG. 3) or mounted to the ratchet head 140 such that the abutments 162 face in a second opposite direction about axis 118.

The ratchet assembly 104 includes a spindle body 166 that is mechanically affixed to bar 114 such that rotation of spindle body 166 rotates bar 114 and consequently adjusts the tightness of strap 110.

In this example, the bar 114 is attached to a reduced diameter portion of spindle body 166 by way of a bolt. In other examples, the bar 114 could be permanently affixed to spindle body 166 as a one-piece construction, welding, etc.

Here, spindle body 166 rotates about ratchet axis 118.

The spindle body 166 has at least one, three in the illustrated embodiment (see FIG. 5), ratchet pawls 168 removably mounted thereto. The ratchet pawls 168 operably engage the teeth 160 of first ratchet gear 152. When the ratchet gear 152 and ratchet head 140 rotate in direction 122, the abutments 162 of the teeth 160 angularly engage abutment ends 170 of the ratchet pawls 168. This engagement prevents the teeth 160 from rotating past the ratchet pawls 168. This causes the pawls 168 to rotate in the same direction 122 about axis 118.

With the pawls 168 mounted to the spindle body 166, this causes the spindle body 166 to rotate in the same direction 122 about ratchet axis 118 to tighten the strap 110. Thus, the ratchet head, 140, ratchet gear 152 and the spindle body 166 all rotate in direction 122 about ratchet axis 118.

However, if the ratchet head 140 rotates in the opposite direction 134 about ratchet axis 118, the cam surfaces 164 of the teeth 160 slide relative to cam surfaces 172 of ratchet pawls 168. Here, the ratchet pawls 168 do not angular engage the teeth 160 and the ratchet gear 152 such that the ratchet gear 152 rotates relative to the spindle body 166 about ratchet axis 118. Typically, this allows for rotation of ratchet gear 152 and ratchet head 140 to rotate about axis 118 while the spindle body 166 remains stationary.

The ratchet pawls 168 are removably mounted in pawl mounting pockets 174 formed in the spindle body 166. The pawls 168 axially inserted into pockets 174 along axis 118 such that the pawls 168 may pivot angularly about ratchet pawl axis 176. Biasing members in the form of springs 178 bias the abutment ends 170 of the pawls 168 radially outward beyond the outer peripheral surface 180 of the spindle body 166 such that the pawls 168 interact with teeth 160 as discussed above depending on the direction of rotation of the ratchet gear 152.

Ratchet pawl axis 176 is parallel to and offset from ratchet axis 118.

With the springs 178 biasing pawls 168 outward, the pawls 168 can engage abutment surfaces 162 if ratchet gear 152 is rotated in direction 122. However, if ratchet gear 152 is rotated in the opposite direction 134, the interaction between cam surface 172 and cam surface 164 will bias the pawls 168 radially inward and the springs 178 will be compressed allowing the ratchet gear 152 and its teeth 160 to slide past pawls 168. This allows the ratchet gear 152 and ratchet head 140 to rotate relative to spindle body 166.

In this example, ratchet pawl 168 has an enlarged head portion 182 about which the ratchet pawl 168 rotate relative to spindle body 166 and pawl axis 176. The pawl pocket 174 has a corresponding mounting region 184A that is sized and shaped to pivotally receive head portion 182 to permit rotation about axis 176. A second mounting region 184B has spring 178 mounted therein. Mounting regions 184A and 184B are identical but angularly oriented in opposite directions relative to a mouth 186 of the pawl pocket 174 through which the ratchet pawl 168 extends when it extends radially outward beyond periphery 180 of the spindle body 166.

When assembled, the ratchet head 140 is secured to the spindle body 166 by mounting bolt 187. The mounting bolt 187 axially secures the ratchet head 140 to spindle body 166 but allows for ratchet head 140 to rotate relative to spindle body 166.

Axial securement of the ratchet head 140 to the spindle body 166 axially secures the ratchet pawls 168 and the springs 178 within the pawl pockets 174.

To hold the strap 110 from loosening, the ratchet assembly 104 includes a holding gear 190 that cooperates with a holding pawl 188. The interaction between the holding pawl 188 and holding gear 190 allows the holding gear 190 to rotate indirection 122 about axis 118 but prevents rotation in the opposite second direction 134. Thus, as torque is applied to ratchet head 140 and ratchet gear 152 in the first direction 122 to rotate spindle body 166 (and consequently bar 114) to tighten strap 110, the holding gear 190 and holding pawl 188 do not inhibit this motion. However, once torque in direction 122 is removed, the holding pawl 188 prevents holding gear 190 from rotating in the second direction 134 even if ratchet gear 152 and ratchet head 140 are permitted to rotate about ratchet axis 118 in the second direction and relative to spindle body 166.

To allow this functionality, the holding gear 190 is removably mountable to the spindle body 166. In this example, a splined connection is provided between the components to prevent relative angular rotation therebetween. Projections 192 of holding gear 190 engage grooves 194 of spindle body 166 to angularly fix the two components to one another. As such, holding gear 190 and spindle body 166 rotate about ratchet axis together.

The holding gear 190 has teeth 196 that have abutments 198 and cam surface 200 that operably cooperate with abutment 202 of holding pawl 188 and cam surface 204 of holding pawl 188. Much like, but in an opposite orientation, abutment 202 engages abutments 198 to prevent rotation of holding pawl 190 in the second direction 134 about ratchet axis 118. However, cam surfaces 200 of teeth 196 slide relative to cam surface 204 of holding pawl 188 when the holding gear 190 is rotated in the first direction 122, such as during tightening action.

In this example, the holding pawl 188 is angularly biased about holding pawl axis 210 into engagement with the teeth 196 of the holding gear 190 by a biasing spring 214, as illustrated by arrow 212 (see FIGS. 3 and 5).

Holding pawl axis 210 is parallel to and offset from ratchet axis 118.

Thus, as a user tightens strap 110 and rotates ratchet head 140, ratchet gear 152, spindle body 166, and holding gear 190 in the first direction 122 to wrap strap 110 about bar 114 by applying torque in the first direction 122, holding gear 190 slides past and is not inhibited from angularly rotating in the first direction 122 by holding pawl 188. However, when torque in the first direction 122 is removed, the teeth 196 of holding gear 190 will engage holding pawl 188 to prevent rotation of the holding gear 190 and spindle body 166 in the second direction 134 and prevent loosening of the strap 110.

With the holding pawl 188 engaged with and preventing rotation of holding gear 190, the user can apply a torque in the second direction 134 to the ratchet head 140 to reverse rotation of the ratchet head 140 and reset for application of torque once again in the first direction 122 to further tighten strap 110. Alternatively, the user could remove bar 150 from the ratchet head 140 and select a different set of apertures in the ratchet head 140 to once again apply torque in the first direction 122.

To release the strap 110, in this example, holding pawl 188 is disengaged from holding gear 190 to permit spindle body 166 to rotate in the second direction 134 about ratchet axis 118.

One operation to disengage holding pawl 188 is to displace holding pawl 188 axially along holding pawl axis 210 so that it is no longer aligned with holding gear 190. This is illustrated by arrow 211 in FIG. 2. This will slide holding pawl 188 axially along mounting bolt 220.

Figure 2:
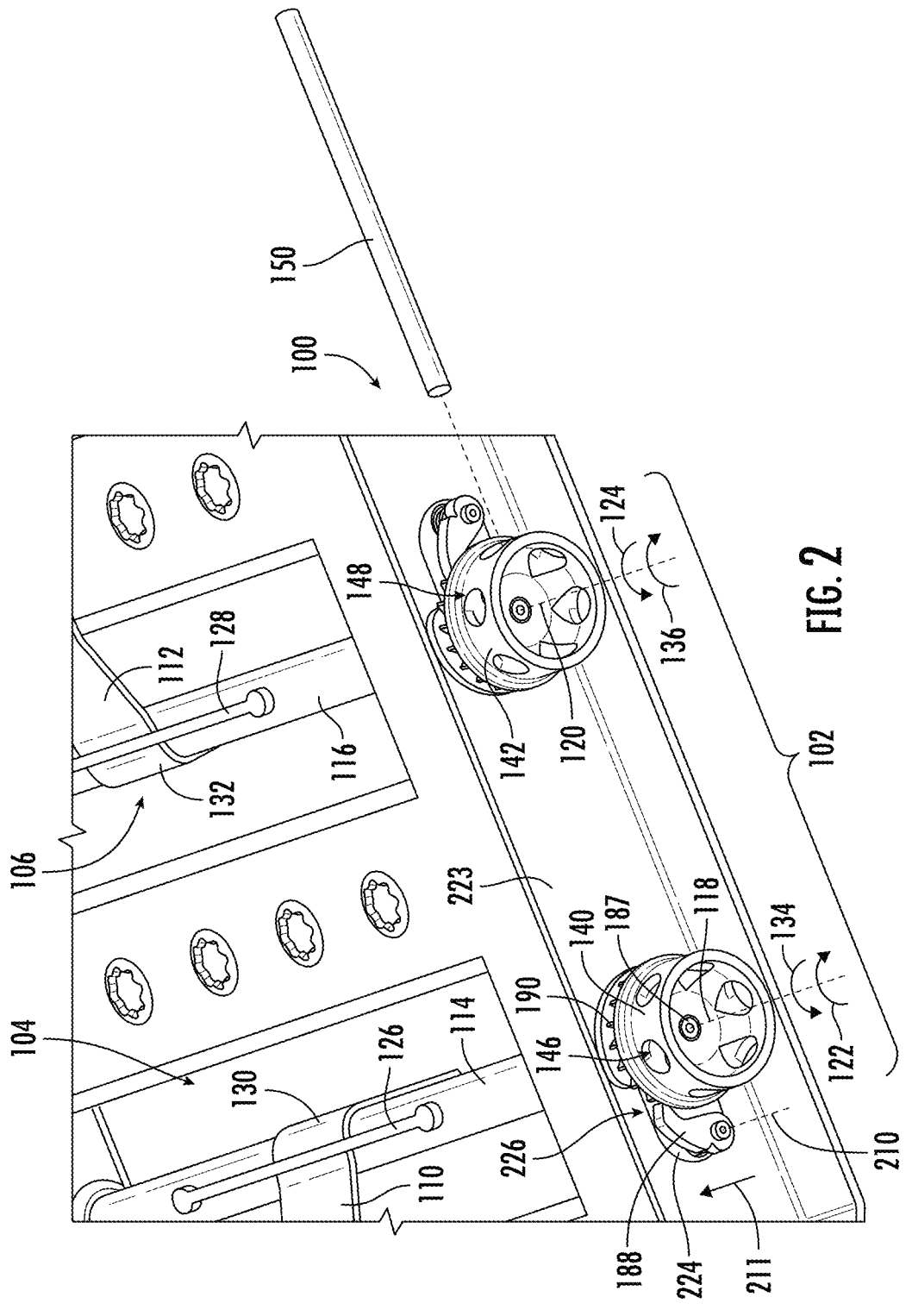
FIG. 2 is an enlarged partial illustration of the ratchet tie down system.

In this example, with reference to FIGS. 2-4, the ratchet assembly 104 includes a mounting body 224 used to mount the assembly, at least at one end, to the frame 223 of deck 100. The mounting body 224 includes an aperture 222 through which a portion of the spindle body 166. The mounting body 224 and the aperture 222 may act as bearing for supporting spindle body 166.

The mounting body 224 includes a mounting portion 230 that is received in a mounting aperture 226 formed in frame 223. Here, the aperture 226 and mounting portion 230 have mating corresponding oval shapes. This prevents rotation of the mounting body 224 relative to frame 223.

With reference to FIG. 4, the mounting body 224 includes an abutment flange 232 that prevents the mounting body 224 from passing through mounting aperture 226 in frame 223 during assembly. The abutment flange 232 is large than and extend radially outward beyond the outer periphery of mounting portion 230.

The components of ratchet assembly 104 are identical to the components of ratchet assembly 106 but with various components arranged in a different orientation such that the second ratchet assembly 106 tightens strap 112 by rotating opposite first ratchet assembly 104 for tightening strap 110.

Figure 6:
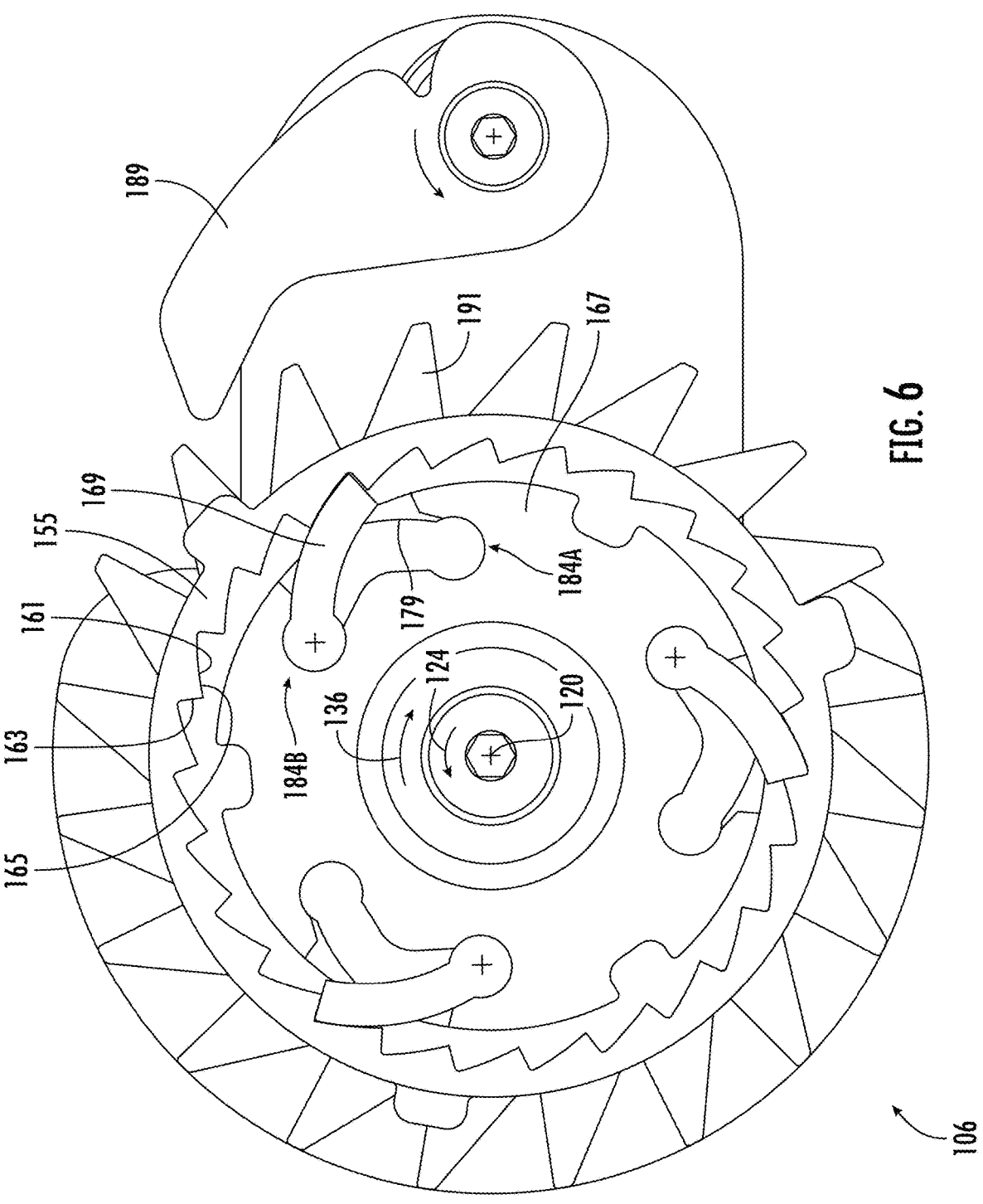
FIG. 6 is a partial end view of another one of the ratchet assemblies of the ratchet tie down system configured to operate in an opposite direction as the ratchet assembly of FIG. 5.

With particular reference to FIGS. 3 and 6, the components that are mounted in a second orientation for configuration of the second ratchet assembly 106 will be described.

Ratchet gear 155 is oriented opposite ratchet gear 152 such that the teeth 161 and particularly abutment surfaces 163 and cam surfaces 165 face the opposite angular direction as the abutment surfaces 162 and cam surfaces 164 of ratchet gear 152. This is simply done by flipping the ratchet gear 155 around 180 degrees as compared to ratchet gear 152 as these two gears are identical.

Ratchet pawls 169 are switched so as to properly engage the teeth 161 of ratchet gear 155. Thus, ratchet pawls 169 are now located with their head portion in mounting region 184B while springs 179 are located in mounting region 184A. Ratchet pawls 168 and 169 and springs 178 and 179 are also identical.

In this second orientation, the ratchet pawls 169 cooperate with the ratchet gear 155 in this second orientation to prevent rotation of ratchet gear 155 and ratchet head 142 relative to spindle body 167 about ratchet axis 120 when torque is applied in direction 136 but to permit rotation in direction 124 as outlined above due to the camming action between ratchet gear 155 and ratchet pawls 169.

Similarly, holding gear 191 and holding pawl 189 have been flipped 180 degrees but are identical to holding gear 190 and holding pawl 188. Thus, the holding pawl 189 and holding gear 191 cooperate to permit rotation of spindle body 167 and holding gear 191 in direction 124 but to prevent rotation of spindle body 167 and holding gear 191 in direction 136, when engaged.

Thus, the comparison of ratchet assemblies 104 shows the first and second orientations of the ratchet gear, the ratchet pawls, the springs of the ratchet pawls, the holding gear and the holding pawl.

Thus, a single ratchet assembly can be configured in each configuration, i.e. either as ratchet assembly 104 or ratchet assembly 106 by simply reorienting several components but without requiring swapping any components.

Because ratchet assembly 104 operates substantially identical to ratchet assembly 106 but in an opposite angular direction about its respective ratchet axis, further description will not be included and the prior description for ratchet assembly 104 will be generally equally applicable to ratchet assembly 106.

Thus, by simply mounting the ratchet gear and ratchet pawls in opposite directions relative to the mounting head and spindle body, reversed operation of the ratcheting features can be provided.

Similarly, by mounting the holding gear and holding pawl in opposite directions relative to the spindle body, reversed operation of the holding features can be provided.

In some examples, removing mounting bolt 187 so that ratchet head 140 can be removed is all that is necessary to allow for reconfiguring the ratchet pawls 168, ratchet gear 152, springs 178, and holding gear 190. Removal of bolt 220 allows for reorienting holding pawl 188.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A reversible ratchet assembly for a ratchet tie down system, the ratchet assembly comprising:
   a spindle body having a ratchet axis;
   a ratchet head configured to have torque applied thereto about the ratchet axis;
   a ratchet gear having a plurality of teeth being angularly spaced apart about the ratchet axis, the ratchet gear removably mountable to the ratchet head for rotation with the ratchet head about the ratchet axis in first and second orientations;
   a ratchet pawl removably mountable to the spindle body in first and second orientations;
   wherein:
      when the ratchet gear is mounted to the ratchet head in the first orientation and the ratchet pawl is mounted to the spindle body in the first orientation, the ratchet gear and ratchet head can rotate relative to the spindle body in a first angular direction about the ratchet axis but the ratchet pawl engages the ratchet gear such that the ratchet gear and ratchet head cannot rotate relative to the spindle body in a second angular direction about the ratchet axis such that rotation of the ratchet head in the second angular direction rotates the spindle body in the second angular direction; and
      when the ratchet gear is mounted to the ratchet head in the second orientation and the ratchet pawl is mounted to the spindle body in the second orientation, the ratchet gear and ratchet head can rotate relative to the spindle body in the second angular direction about the ratchet axis but the ratchet pawl engages the ratchet gear such that the ratchet gear and ratchet head cannot rotate relative to the spindle body in the first angular direction about the ratchet axis such that rotation of the ratchet head in the first angular direction rotates the spindle body in the first angular direction.

2. The ratchet assembly of claim 1, further comprising:
   a holding gear having a plurality of teeth being angularly spaced apart about the ratchet axis, the holding gear removably mountable to the spindle body for rotation with the spindle body about the ratchet axis in first and second orientations;
   a holding pawl mountable relative to the holding gear in first and second orientations;
   wherein:
      when the holding gear is mounted to the spindle body in the first orientation and the holding pawl is mounted relative to the holding gear in the first orientation, the holding gear and spindle body can rotate in the second angular direction about the ratchet axis but the holding pawl engages the holding gear such that the holding gear and spindle body are prevented from rotating in the first angular direction about the ratchet axis; and
      when the holding gear is mounted to the spindle body in the second orientation and the holding pawl is mounted relative to the holding gear in the second orientation, the holding gear and spindle body can rotate in the first angular direction about the ratchet axis but the holding pawl engages the holding gear such that the holding gear and spindle body are prevented from rotating in the second angular direction about the ratchet axis.

3. The ratchet assembly of claim 2, wherein the holding gear is removably mountable to the spindle body in the first and second orientations with a splined connection.

4. The ratchet assembly of claim 2, further comprising a mounting body, the holding pawl being removably attachable to the mounting body in the first and second orientations.

5. The ratchet assembly of claim 4, wherein the holding pawl pivots about a holding pawl axis that is parallel to the ratchet axis and radially offset from the ratchet axis.

6. The ratchet assembly of claim 1, wherein the ratchet gear is removably mountable to the ratchet head in the first and second orientations with a splined connection.

7. The ratchet assembly of claim 1, wherein a ratchet pawl biasing member biases the ratchet pawl radially outward relative to the spindle body, the teeth of the ratchet gear bias the ratchet pawl radially inward when the ratchet gear rotates relative to the spindle body.

8. The ratchet assembly of claim 1, wherein the ratchet pawl pivots relative to the spindle body about a ratchet pawl axis that is parallel to the ratchet axis and radially offset from the ratchet axis.

9. The ratchet assembly of claim 1, wherein the ratchet head has a plurality of angularly offset handle receiving openings formed therein configured for receipt of a handle therein, the handle transferring torque to the ratchet head.

10. The ratchet assembly of claim 1, wherein the ratchet head is removably attachable to the spindle body, the ratchet head securing the ratchet pawl to the spindle body.

11. The ratchet assembly of claim 10, wherein the ratchet pawl may be transitioned between the first and second orientations when the ratchet head is removed from the spindle body.

12. The ratchet assembly of claim 1, further comprising a tie-down strap; and wherein the spindle body has a main body portion and a spindle shaft, the ratchet pawl mountable to the main body portion in the first and second orientations, the tie-down strap fixedly attachable to the spindle body and wrapable around the spindle shaft when the spindle shaft rotates about the ratchet axis.

13. The ratchet assembly of claim 12, wherein the spindle shaft is removably attached to the main body portion.

14. A ratchet system for a tie-down system for a transport trailer comprising:

first and second ratchet assemblies, each of the first and second ratchet assemblies being a reversible ratchet assembly of claim 1;

the ratchet gear of the first ratchet assembly being in the first orientation and the ratchet pawl of the first ratchet assembly being in the first orientation; and the ratchet gear of the second ratchet assembly being in the second orientation and the ratchet pawl of the second ratchet assembly being in the second orientation.

15. The ratchet system of claim 14, wherein the ratchet axis of the first ratchet assembly is parallel to the ratchet axis of the second ratchet assembly.

16. The ratchet system of claim 15, wherein the first angular direction of the first ratchet assembly is the same as the first angular direction of the second ratchet assembly.

17. The ratchet system of claim 14, wherein:

each of the first and second ratchet assemblies includes:

a holding gear having a plurality of teeth being angular spaced apart about the ratchet axis, the holding gear removably mountable to the spindle body for rotation with the spindle body about the ratchet axis in first and second orientations;

a holding pawl mountable relative to the holding gear in first and second orientations;

wherein:

when the holding gear is mounted to the spindle body in the first orientation and the holding pawl is mounted relative to the holding gear in the first orientation, the holding gear and spindle body can rotate in the second angular direction about the ratchet axis but the holding pawl engages the holding gear such that the holding gear and spindle body are prevented from rotating in the first angular direction about the ratchet axis; and when the holding gear is mounted to the spindle body in the second orientation and the holding pawl is mounted relative to the holding gear in the second orientation, the holding gear and spindle body can rotate in the first angular direction about the ratchet axis but the holding pawl engages the holding gear such that the holding gear and spindle body are prevented from rotating in the second angular direction about the ratchet axis;

wherein:

the holding gear of the first ratchet assembly is in the first orientation and the holding pawl of the first ratchet assembly is in the first orientation; and the holding gear of the second ratchet assembly is in the second orientation and the holding pawl of the second ratchet assembly is in the second orientation.

18. The ratchet system of claim 14, wherein the components of the first and second ratchet assemblies are identical.

19. A method of assembling the ratchet system of claim 14, comprising:

for the first ratchet assembly:

a) mounting the ratchet gear to the ratchet head in the first orientation; and b) mounting the ratchet pawl to the spindle body in the first orientation;

for the second ratchet assembly:

a) mounting the ratchet gear to the ratchet head in the second orientation; and b) mounting the ratchet pawl to the spindle body in the second orientation.

20. A method of assembling the ratchet system of claim 17, comprising:

for the first ratchet assembly:

a) mounting the ratchet gear to the ratchet head in the first orientation; and b) mounting the ratchet pawl to the spindle body in the first orientation;

for the second ratchet assembly:

a) mounting the ratchet gear to the ratchet head in the second orientation; and b) mounting the ratchet pawl to the spindle body in the second orientation;

for the first ratchet assembly:

a) mounting the holding gear to the spindle body in the first orientation; and b) mounting the holding pawl relative to the holding gear in the first orientation;

for the second ratchet assembly:

a) mounting the holding gear to the spindle body head in the second orientation; and b) mounting the holding pawl relative to the holding
   gear in the second orientation.

* * * * *